No. 730,731. PATENTED JUNE 9, 1903.
D. T. ABERCROMBIE.
CAMPING UTENSIL.
APPLICATION FILED AUG. 8, 1902.

NO MODEL.

Witnesses
Ivan Konigsberg.
Harry H. Walton.

Inventor
David T. Abercrombie
By his Attorney
Alexander C. Proudfit.

No. 730,731. Patented June 9, 1903.

UNITED STATES PATENT OFFICE.

DAVID T. ABERCROMBIE, OF NEWARK, NEW JERSEY, ASSIGNOR TO ABERCROMBIE & FITCH, OF NEW YORK, N. Y., A FIRM.

CAMPING UTENSIL.

SPECIFICATION forming part of Letters Patent No. 730,731, dated June 9, 1903.

Application filed August 8, 1902. Serial No. 118,851. (No model.)

*To all whom it may concern:*

Be it known that I, DAVID T. ABERCROMBIE, of Newark, New Jersey, have invented certain Improvements in Camping Utensils, of which the following description, in connection with the accompanying drawings, is a specification, like figures on the drawings designating like parts.

This invention relates to cooking utensils, and has for its object to provide such a utensil as a frying-pan with a removable handle which will afford a strong means for manipulating said utensil when connected thereto, but will at the same time have the capacity for ready disconnection to be packed within the utensil and render the latter particularly available for camping purposes, the quality of lightness being especially desirable, so that my improvements have been directed particularly toward a construction which will enable the use of this metal, which has been found difficult heretofore to accomplish in a form consistent with compactness.

The various features of my invention will be illustrated and described fully in the accompanying drawings and specification and set forth in the claims.

Figure 1:
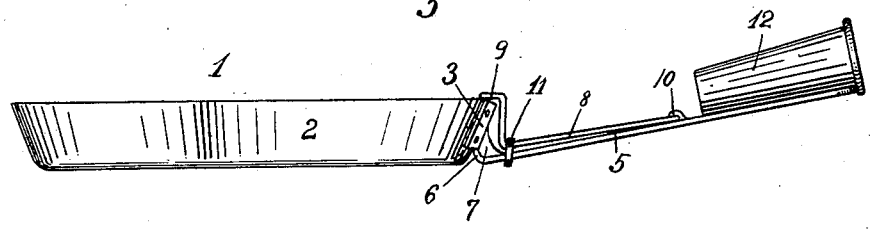
Figure 2:
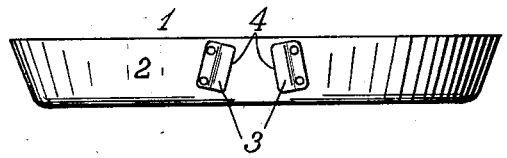
Figure 3:
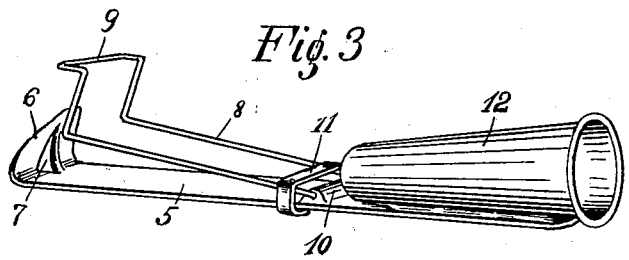

In the drawings, Figure 1 shows in side elevation a frying-pan in the construction of which my invention has been embodied. Fig. 2 is a front elevation of the pan with the handle removed, and Fig. 3 is a perspective of the handle separately.

In the embodiment of my invention selected for illustration and description as a convenient form to enable a ready and complete understanding of my improvements the reference-numeral 1 designates a cooking utensil which may be considered as a frying-pan, preferably made of aluminium and having sides 2, provided with a socket, constructed in the instance illustrated by riveting two pieces 3 of metal to the side at a slight distance from each other and slightly raised at their adjacent edges 4. The socket formed thus is flat and preferably slightly smaller at the top than at its entrance at the bottom, and to enter and coöperate with this socket the shank 5 of the handle has a flat upwardly-directed foot 6, to strengthen which I provide a vertical web or ligament 7 between the foot and shank, the web standing between the socket-pieces 3, the tapering form of the socket enabling a snug fit and firm connection of the foot therewith. By constructing the handle thus I am enabled to use cast aluminium as the material for the shank and foot, and I prefer to use this metal for the sake of lightness, although it will be understood that other metals may be used to advantage in the same form.

To retain the handle against accidental displacement from the socket, I provide a retaining member formed of wire and comprising a shank portion 8 to lie along the handle-shank and a rim-engaging portion 9, the retaining member being connected to the handle in any convenient manner, as by inserting the free ends of the wire in a socket 10, which may and preferably will be cast integral with the shank.

To hold the retaining member in operation, I have shown as one form of suitable means a slide 11, movable along the shanks to embrace them both and hold the retaining portion firmly against the rim and also movable to free the retaining member, when the handle may be withdrawn downwardly from the socket.

If desired, the handle may be provided, further, with a grip 12, of sheet metal in tubular form, riveted to the handle or otherwise suitably secured thereto.

Having thus fully illustrated and described my improvements, it will be understood that I do not limit myself to the specific form and material illustrated and described in every respect nor in general otherwise than as set forth in my claims read in connection with this specification.

What I claim, and desire to secure by Letters Patent, is—

1. The combination with a pan or similar utensil, having a socket with a downwardly flaring or opening entrance; of a handle having an upwardly-directed foot to enter said socket removably, to enable support of said utensil by said handle; a retaining member to engage the rim of said utensil removably, to hold said handle in place; and means to maintain said retaining member in operative connection with said utensil and handle, substantially as described.

2. The combination with a pan or similar utensil, having a socket with a downwardly flaring or opening entrance; of a handle having an upwardly-directed foot to enter said socket removably, to enable support of said utensil by said handle; a wire retaining member mounted pivotally upon said handle and comprising a shank portion extended along said handle, and a rim-engaging portion; and a slide to embrace said handle and shank, being movable thereon into position to maintain said rim-engaging portion in operation, and also movable into position to permit said retaining member to swing away from said rim and allow said handle to be withdrawn downward from said socket.

3. A handle of the class described, comprising a shank of cast aluminium having an upwardly-directed foot connected by a vertical web or ligament to said shank, substantially as described.

4. A handle of the class described, comprising a shank, a foot, an integral vertical connecting-web, and a separately-formed tubular grip fastened to said shank, substantially as described.

Signed at New York, in the county of New York and State of New York, this 29th day of July, A. D. 1902.

DAVID T. ABERCROMBIE.

Witnesses:
WESTMINSTER ABBEY,
HARRY H. WALTON.